UNITED STATES PATENT OFFICE.

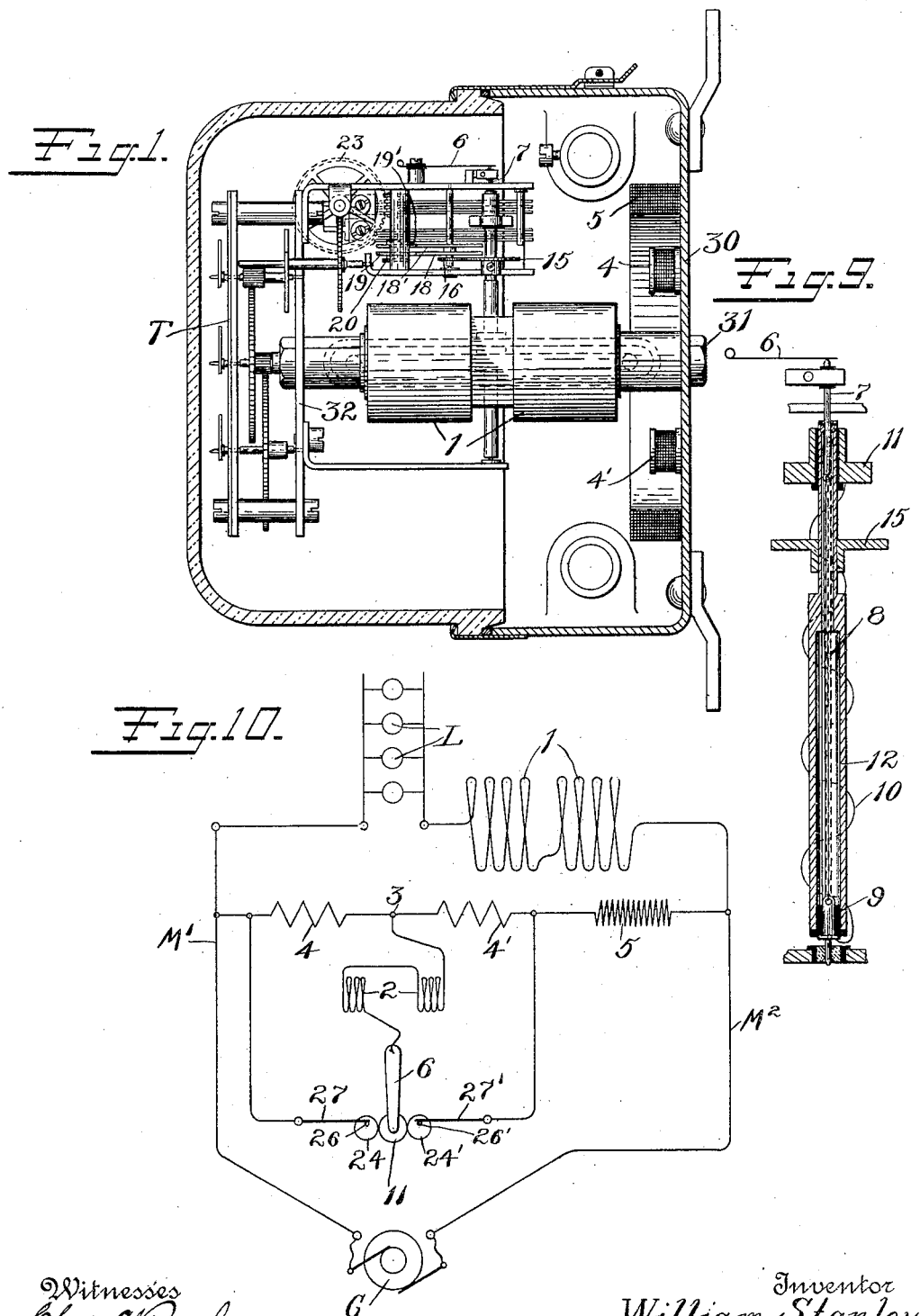

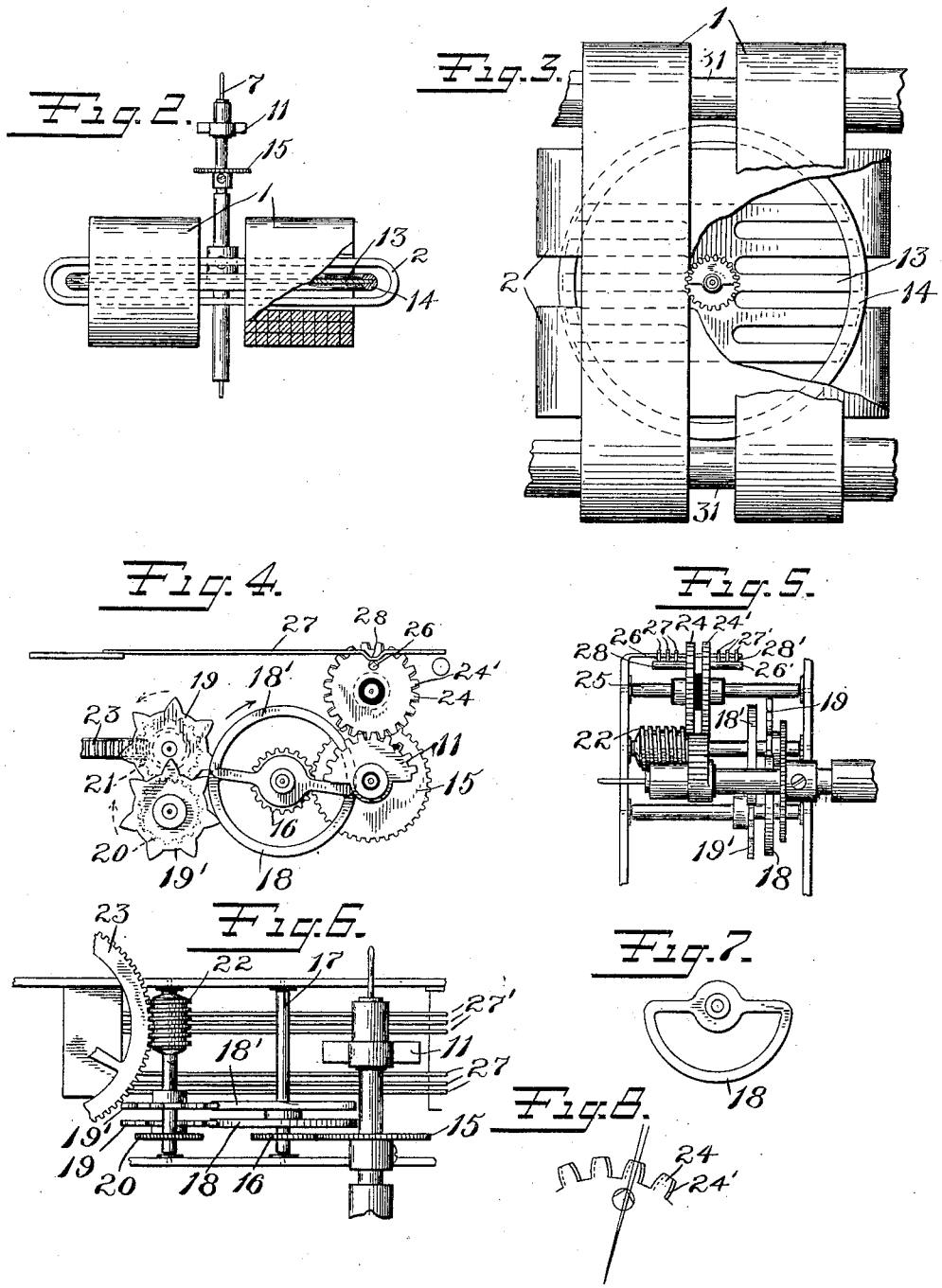

WILLIAM STANLEY, OF GREAT BARRINGTON, MASSACHUSETTS.

ELECTRIC METER.

No. 809,995.   Specification of Letters Patent.   Patented Jan. 16, 1906.

Application filed March 7, 1905. Serial No. 248,869.

*To all whom it may concern:*

Be it known that I, WILLIAM STANLEY, a citizen of the United States, residing at Great Barrington, Berkshire county, Massachusetts, have invented certain new and useful Improvements in Electric Meters, of which the following is a full, clear, and exact description.

My invention relates to electric meters, and has for its object to produce a meter of the oscillating type in which the record of the number of oscillations shall indicate the current that is consumed by the translating device.

The meter is capable of being used to measure alternating as well as continuous currents and has no dead-point, so that it is self-starting under all conditions.

The operation of the meter depends upon the fact that a magnetic needle when subject to the influence of a magnetizing-coil will oscillate at a rate inversely proportional to the field in which the oscillations take place, frictional resistance being slight and the inertia of the moving system being comparatively great. If there were no frictional resistance retarding the moving system and tending to reduce the amplitude of the oscillations, such a needle, if once started, would forever oscillate with a frequency of $T = \frac{1}{F}$ where T equals the time of oscillation and F equals the number of lines of magnetic force at right angles to its axis. In practice, however, unless an added impulse is given from time to time the friction will cause it to come to rest. In my present invention I have provided a novel means for compensating for the retardation due to friction, such means consisting of an auxiliary coil whose axis is at an angle to the axis of the main magnetizing-coil and devices for energizing said auxiliary coil periodically, so as to periodically impress upon the needle an added force or impulse of such value as will be sufficient to balance the retarding effect of the frictional resistance. Preferably the auxiliary coil is energized alternately in opposite directions, so as to impress such a force or impulse upon the needle during its movement in each direction. The number of oscillations taking place is recorded by a suitable indicating mechanism, the record of which will truly indicate the strength of the main field, determining the time of oscillation of the needle, and consequently the strength of the currents producing such a field.

My invention also involves a novel means for reversing the current in a coil, and a novel means for producing a rotary movement by an oscillating member.

The following is a description of a meter embodying my invention, reference being had to the accompanying drawings, in which—

Figure 1 represents a side elevation of the meter, the case being in section. Fig. 2 represents a front elevation of the main and auxiliary coils of the meter, together with the needle upon which they act, one coil being partially broken away. Fig. 3 represents a plan view of the same, the coils being partially broken away. Fig. 4 represents a plan view of the commutating mechanism and mechanism for converting the oscillatory motion into continuous rotary motion. Fig. 5 represents an end elevation of the same with the supporting side plates. Fig. 6 represents a plan view of Fig. 4 with the supporting side plates. Fig. 7 represents a detail plan view of an abutment. Fig. 8 represents an enlarged detail of elements of the commutating mechanism. Fig. 9 represents a sectional view of the shaft of the needle, showing the means employed for supporting it. Fig. 10 is a diagram of the circuits.

The mechanism consists of a main coil or winding 1 in series with the load L and an auxiliary coil 2, having its axis at an angle to the axis of the winding 1, preferably at a right angle thereto. The auxiliary winding 2 has one of its terminals connected at an intermediate point 3 between two auxiliary resistances 4 4', which, together with the main resistance 5, constitute a shunt-circuit between the mains $M'$ $M^2$ The other terminal of the auxiliary winding 2 is connected to a spring-contact 6, which through the rod 7, supporting-chain 8, insulated pivot 9, and conductor 10 is electrically connected with the toothed master member 11, mounted on the shaft 12 and insulated therefrom. The shaft 12 carries the needle 13, the same being of magnetic material, with its ends preferably slotted, and engaging the non-magnetic ring 14, constituting a balance-wheel for increasing the inertia of the moving system. The shaft 12 also carries the gear 15, which in turn meshes with the gear 16, mounted on the shaft 17, which carries two moving abutments 18 18', one of which is in a plane with the star-wheel 19, while the other is in a plane with the star-wheel 19'. These two star-wheels are connected together by gearwheels 20 21, mounted upon their respective shafts. One of these shafts carries a worm 22, which engages with the worm-wheel 23, which transmits a rotary motion to the integrating-train T. As the needle oscillates an oscillating movement is given to the abutments 18 18' also. This movement is of greater amplitude than that of the needle on account of the ratio of the gears. When the star-wheels 19 19' are in the positions shown in Fig. 4 and the abutments 18 18' are moving in the direction indicated by the arrow, the forward shoulder of the lower abutment 18 engages with a tooth of the star-wheel 19 and causes it and the other star-wheel 19', geared thereto, to move in the direction indicated by the dotted arrows. The movement continues until the tooth of the star-wheel 19 which was in the path of the forward shoulder of the abutment 18 reaches the circular portion of that abutment 18. The star-wheel 19 is then locked in the position, and neither star-wheel can move until the forward shoulder of the abutment 18 reaches the point where the star-wheel 19 is released. When this happens, the forward shoulder of the abutment 18' engages a tooth of the star-wheel 19', which has been moved through the star-wheel 19 into a position to be engaged by such abutment. When this engagement takes place, both star-wheels are again moved in the same direction as before such a distance that a tooth of the first star-wheel 19 is again brought into position to be engaged by the forward shoulder of the abutment 18. The abutments, therefore, directly or indirectly, move both star-wheels in the same direction, and the star-wheels are indirectly actuated each by the abutment of the others, so as to alternately present teeth to be engaged by their own abutments at such time as to produce continuous rotation in one direction. The oscillating movement of the needle is thus by this simple and accurate means converted into a rotary movement in one direction which can be indicated upon the integrating-train T. The star-wheels by engagement with the surface of the abutments are locked against movement practically all the time that they are not being impelled by the abutments.

In order to commutate the current passing through the auxiliary coil 2, I provide two toothed members 24 24', adapted to make electric contact with the toothed master member 11. These toothed members 24 24' are slightly offset from one another about five one-thousandths of an inch. (See Fig. 8.) They are insulated from each other and mounted upon the common shaft 25. These toothed members 24 and 24' are respectively provided with contact-pins 26 and 26', which are adapted to be engaged by brushes 27 and 27'. These brushes are connected, respectively, to the outer terminals of the auxiliary resistances 4 and 4' and are provided with projections 28 and 28', such that the pins 26 and 26' engage with the brushes during a brief period when the axis of the needle 13 substantially coincides with the axis of the windings 1. The toothed members 24 24' by reason of their being offset alternately make electric contact with the master toothed member 11, dependent upon the direction in which the needle is moved. Thus in Fig. 4, if the needle is swinging toward the right, the master toothed member 11 makes electric contact with the lower offset toothed member 24', while if the needle is swinging toward the left, the master toothed member 11 makes electric contact with the upper offset toothed member 24. That being the case, the auxiliary coil 2 during the short period that the brushes 27 27' make contact with the pins 26 26' upon the toothed members 24 24' is connected in shunt around one of the auxiliary resistances 4 4' and as the needle moves in the other direction is during that short period electrically connected in shunt around the other of the auxiliary resistances 4 4'. When the auxiliary coil 2 is connected in shunt around the auxiliary resistance 4, the current in it flows from the spring-contact 6 to the terminal connected at the point 3 between the two auxiliary resistances 4 4'. When, however, the winding 2 is in shunt with the auxiliary resistance 4', the current flows from the point 3 between the two auxiliary resistances 4 4' to the spring member 6, or, in other words, connecting the outer terminal of the auxiliary winding alternately to points outside the two auxiliary resistances, producing a current in the auxiliary winding flowing alternately in opposite directions. This current-flow in the auxiliary winding takes place when the needle is substantially in line with the axis of the main coil, and the magneto-motive force set up thereby acting with the magneto-motive force of the main coils produces a polar line always in advance of the needle, thus setting up a forward impulse at each oscillation. When the resistances of the shunt-circuit and the auxiliary winding are properly proportioned, this added impulse given to the needle is sufficient to overcome the retardation due to friction and keep it oscillating as long as current flows in the main coil. The auxiliary and main resistances 4, 4', and 5 are preferably non-inductive resistances, in which case on account of the small self-induction of the actuating coils or windings the meter can be used to measure alternating currents, as well as direct currents.

The parts are suitably mounted on a base 30, from which project bolts 31 31, which pass through the windings 1, (thereby supporting them and the windings 2,) and are then fastened to the plate 32, which supports the train and, being provided with projections in which are journaled the other working parts, support these parts also.

The means I have shown for commutating the current and for converting the oscillating movement into continuous rotary movement while constituting important parts of my invention can be modified or one or both replaced by other suitable mechanism for accomplishing these results, and the ninety-degree relation between the main and the auxiliary coils, while preferable, is not essential, since it, as well as the other features, admits of modifications and variations while still well within the spirit of the broad invention.

What I claim is—

1. In a meter, the combination of a main series winding, an auxiliary winding at an angle thereto, a needle subject to the action of both windings, and having its axis of rotation substantially at right angles to the axes of both of said windings and means for periodically energizing said auxiliary winding so as to give the needle periodical impulses and maintain it in motion so long as current is passing through the series winding.

2. In a meter, the combination of a main winding carrying the current to be measured, an auxiliary winding having its axis at an angle relatively to that of the main winding, means for periodically energizing said auxiliary winding, and an oscillating needle within the influence of both windings, and having its axis of rotation substantially at right angles to the axes of both of said windings, and means for converting the oscillatory movement of the needle into rotary movement, and means for recording the amount of said rotary movement.

3. In a meter, the combination of a main series winding, an auxiliary winding at an angle thereto, a needle subject to the action of both windings, and means for periodically energizing said auxiliary windings by currents passed through said auxiliary winding alternately in opposite directions so as to give the needle periodical impulses and maintain it in motion when current is passing through the series winding.

4. In a meter, the combination of a main winding carrying the current to be measured, an auxiliary winding having its axis at an angle relatively to that of the main winding, an oscillating needle within the influence of both of said windings and means for energizing said auxiliary winding alternately in opposite directions so as to give said needle an impulse during its movement in each direction, and means for producing by said oscillating needle a rotary motion in one direction, and means for indicating the amount of said rotary movement.

5. In a meter, the combination of a main series winding, and an auxiliary winding at right angles thereto, an oscillating needle within the influence of both windings, and a commutator controlled by said needle for reversing the current through said auxiliary windings.

6. In a meter the combination of a main winding carrying the current to be measured, an auxiliary winding having its axis at right angles to the axis of said main winding, a swinging needle within the influence of both windings, and means for causing the current to pass through said auxiliary winding alternately in opposite directions, so as to assist in maintaining said needle in motion so long as current flows in said main winding.

7. In a meter, the combination of a main winding carrying the current to be measured, an auxiliary winding having its axis at right angles to the axis of said main winding, a swinging needle within the influence of both windings, and two resistances in series having a common point between at which one terminal of said auxiliary winding is connected, and means for causing said auxiliary winding thus connected to shunt said resistances alternately.

8. In a meter, the combination of a main series winding 1, a shunt-winding 2, a needle 13 within the influence of both of said windings, means for periodically energizing said auxiliary winding, abutments 18 18' oscillated by said needle, star-wheels 19 19' coöperating with said abutments and geared to each other and an integrating-train geared to said star-wheels.

9. In a meter, the combination of a main winding carrying the current to be measured, an auxiliary winding having its axis at right angles to the axis of the main winding, a swinging needle within the influence of both windings, and two auxiliary resistances in series, having a common point between them at which one terminal of said auxiliary winding is connected, and means for causing said auxiliary winding thus connected to shunt said resistances alternately, and a high main resistance in series with said auxiliary resistances.

10. In a meter, the combination of a series winding, a shunt-circuit having a main and two auxiliary resistances therein, an auxiliary winding having one of its terminals connected to said shunt-circuit between said auxiliary resistances, a needle subject to the influence of both of said windings, means for registering an amount proportional to the number of oscillations of said needle, a toothed controlling member oscillating with said needle and connected to the other terminal of said auxiliary winding, two insulated and offset toothed members meshing with said toothed controlling member, and means for electrically connecting one of said two offset members first to the outside of one of said auxiliary resistances and then to the outside of the other of said auxiliary resistances.

11. In a meter, the combination of a main winding carrying the current to be measured, an auxiliary winding having its axis at an angle relatively to that of the main winding, an oscillating needle within the influence of both windings, a circuit containing two resistances having a common point between them to which one terminal of said auxiliary winding is connected, a toothed master member to which the other terminal of said auxiliary winding is connected, and insulated toothed portions electrically connected respectively to points on said shunt-circuit outside said resistances and adapted to be engaged by said geared master member, said insulated toothed members being offset relatively to one another.

12. In a meter, a series winding, a shunt-circuit having a main resistance 5 and two auxiliary resistances 4 4' therein, an auxiliary winding having one terminal connected between said auxiliary resistances, and a needle subject to both of said windings, and means actuated by said needle for connecting the other terminal of said auxiliary winding alternately with each of the outer terminals of said auxiliary resistances.

Signed at Great Barrington, this 2d day of March, 1905.

WILLIAM STANLEY.

Witnesses:
L. F. PARKHURST,
H. M. SMITH.